United States Patent
Tran et al.

(10) Patent No.: US 10,322,336 B2
(45) Date of Patent: Jun. 18, 2019

(54) HAPTIC BRAILLE OUTPUT FOR A GAME CONTROLLER

(71) Applicant: Microsoft Technology Licensing, LLC, Redmond, WA (US)

(72) Inventors: Jessica Julie Tran, Renton, WA (US); John Richard Porter, III, Lynnwood, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/793,786

(22) Filed: Oct. 25, 2017

(65) Prior Publication Data

US 2018/0214771 A1 Aug. 2, 2018

Related U.S. Application Data

(63) Continuation-in-part of application No. 15/445,786, filed on Feb. 28, 2017.
(Continued)

(51) Int. Cl.
*A63F 13/24* (2014.01)
*A63F 9/00* (2006.01)
(Continued)

(52) U.S. Cl.
CPC .............. *A63F 9/0001* (2013.01); *A63F 9/00* (2013.01); *A63F 13/218* (2014.09); *A63F 13/24* (2014.09);
(Continued)

(58) Field of Classification Search
None
See application file for complete search history.

(56) References Cited

U.S. PATENT DOCUMENTS

| 5,466,154 A | 11/1995 | Thompson |
| 5,522,728 A | 6/1996 | Kaplan |

(Continued)

FOREIGN PATENT DOCUMENTS

| JP | H107163614 A | 6/1995 |
| JP | 2006247024 A | 9/2006 |

(Continued)

OTHER PUBLICATIONS

"International Search Report and Written Opinion Issued in PCT Application No. PCT/US2018/015114", dated Apr. 6, 2018, 13 Pages.
(Continued)

*Primary Examiner* — Jason T Yen
(74) *Attorney, Agent, or Firm* — Alleman Hall Creasman & Tuttle LLP

(57) ABSTRACT

A game controller with haptic Braille chording capability. While a conventional game controller are geared to sighted players, the disclosed controller configurations include various adaptations that provide alternative input and outputs to facilitate game play by sight-impaired or blind users, as well as other users knowledgeable of Braille. A number of paddles may be arranged on a game controller housing so that a player may engage selected ones of the paddles to enable encoding braille characters using the paddles. This input may be used to control a game, enter text into a chat session or take any other action desired. The converse may also occur, where a combination of the paddles may provide haptic feedback detectable by a user holding a game controller so that the paddles encode braille output (or other data), allowing a user to receive output simply by contact with the paddles.

20 Claims, 8 Drawing Sheets

Related U.S. Application Data

(60) Provisional application No. 62/453,404, filed on Feb. 1, 2017.

(51) Int. Cl.

| | | |
|---|---|---|
| *A63F 13/218* | (2014.01) | |
| *G09B 21/00* | (2006.01) | |
| *A63F 13/285* | (2014.01) | |
| *A63F 13/92* | (2014.01) | |

(52) U.S. Cl.
CPC ............ *A63F 13/285* (2014.09); *A63F 13/92* (2014.09); *G09B 21/004* (2013.01); *A63F 2009/0003* (2013.01); *A63F 2009/0004* (2013.01); *A63F 2300/1037* (2013.01); *A63F 2300/1056* (2013.01)

(56) References Cited

U.S. PATENT DOCUMENTS

| | | |
|---|---|---|
| 5,580,251 A | 12/1996 | Gilkes et al. |
| 5,736,978 A | 4/1998 | Hasser et al. |
| 5,766,014 A | 6/1998 | Ida et al. |
| 6,059,575 A | 5/2000 | Murphy |
| 6,230,135 B1 | 5/2001 | Ramsay et al. |
| 6,357,940 B1 * | 3/2002 | Murphy ............... G09B 21/003 341/23 |
| 6,639,510 B1 | 10/2003 | Soulie |
| 6,864,877 B2 | 3/2005 | Braun et al. |
| 7,018,209 B2 | 3/2006 | Schleppenbach et al. |
| 7,071,844 B1 | 7/2006 | Moise |
| 7,113,177 B2 | 9/2006 | Franzen |
| 7,226,291 B2 | 6/2007 | Spedden |
| 7,432,912 B2 | 10/2008 | Cote et al. |
| 7,723,896 B2 | 5/2010 | Esashi et al. |
| 8,411,058 B2 | 4/2013 | Wong et al. |
| 8,884,790 B2 | 11/2014 | Page |
| 8,884,901 B2 | 11/2014 | Landau et al. |
| 9,240,129 B1 | 1/2016 | Niemann |
| 9,285,840 B2 | 3/2016 | Kamin-Lyndgaard |
| 9,691,300 B2 | 6/2017 | Wong et al. |
| 2004/0197745 A1 | 10/2004 | Hong et al. |
| 2005/0179565 A1 | 8/2005 | Mase et al. |
| 2008/0138774 A1 | 6/2008 | Ahn et al. |
| 2010/0052950 A1 | 3/2010 | Collier |
| 2012/0050172 A1 * | 3/2012 | Wong ...................... G06F 3/011 345/173 |
| 2012/0146890 A1 * | 6/2012 | Karstens ................. G06F 3/016 345/156 |
| 2012/0240435 A1 * | 9/2012 | Meeks ................. G09B 21/008 40/586 |
| 2012/0299853 A1 | 11/2012 | Dagar |
| 2013/0029297 A1 * | 1/2013 | Tsai ..................... G09B 21/003 434/114 |
| 2014/0132568 A1 * | 5/2014 | Hirose .................... G06F 3/016 345/175 |
| 2014/0377721 A1 | 12/2014 | Reid et al. |
| 2014/0377722 A1 | 12/2014 | Reid et al. |
| 2015/0317915 A1 | 11/2015 | Nelson et al. |
| 2016/0018890 A1 | 1/2016 | Deokar et al. |
| 2016/0317919 A1 | 11/2016 | Gassoway et al. |
| 2018/0214771 A1 | 8/2018 | Tran et al. |
| 2018/0214780 A1 | 8/2018 | Tran et al. |

FOREIGN PATENT DOCUMENTS

| | | |
|---|---|---|
| WO | 0221251 A1 | 3/2002 |
| WO | 2004013827 A2 | 2/2004 |
| WO | 2004077379 A2 | 9/2004 |
| WO | 2006014603 A2 | 2/2006 |
| WO | 2007112467 A1 | 10/2007 |
| WO | 2009072993 A1 | 6/2009 |
| WO | 2015083183 A1 | 6/2015 |
| WO | 2016176010 A1 | 11/2016 |

OTHER PUBLICATIONS

"International Search Report and Written Opinion Issued in PCT Application No. PCT/US2018/015115", dated Apr. 12, 2018, 10 Pages.

Karastoyanov, et al., "Development of a Braille Tactile Device Driven by Linear Magnet Actuators", In International Journal of Engineering and Innovative Technology, vol. 4, Issue 2, Aug. 2014, pp. 35-43.

Varada, Vijay Raghav, "Refreshable Braille Display", Retrieved on: Aug. 1, 2016 Available at: https://hackaday.io/project/10849-refreshable-braille-display.

Chakraborti, P et al.; "A Compact Dielectric Elastomer Tubular Actuator for Refreshable Braille Displays"; Elsevier Sensors and Actuators A 179 151-157; Feb. 2012; 7 Pages.

Ren, Kailiang et al.; "A Compact Electroactive Polymer Actuator Suitable for Refreshable Braille Display"; Elsevier, Sensors and Actuators A 143 335-342 (2008); www.sciencedirect.com; Nov. 2007; 8 Pages.

Basciftci, Fatih et al.; "An Interactive and Multi-functional Refreshable Braille Device for the Visually Impaired"; Elsevier, Displays 41 (2016) 33-41; Nov. 2015.

Bar-Cohen, Yoseph; "Electroactive Polymers for Refreshable Braille Displays"; Pasadena, CA; 2009 SPIE-Newsroom; 3 pages.

Russo, et al., "Creating Video Games for the Visually Impaired", Published on: Apr. 12, 2012 Available at https://www.wpi.edu/Pubs/E-project/Available/E-project-052312-121436/unrestricted/IQP_MBJ_0007.pdf.

"Vibrations series of products for deafblind", Retrieved From <<https://web.archive.org/web/20120414225033/http:/www.bapsi.org/vibrations-series-of-products-for-deafblind>>, Apr. 14, 2012, 3 pages.

U.S. Appl. No. 15/445,771, Tran, et al., "Refreshable Braille Display Accessory for a Game Controller", Filed Date: Feb. 28, 2017, 23 Pages.

U.S. Appl. No. 15/445,786, Tran, et al., "Braille chording accessory for a game Controller", Filed Date: Feb. 28, 2017, 22 Pages.

"International Search Report and Written Opinion Issued in PCT Application No. PCT/US2018/055764", dated, Jan. 23, 2019, 12 Pages.

"Non Final Office Action Issued in U.S. Appl. No. 15/445,786", dated, Nov. 29, 2018, 8 Pages.

* cited by examiner

US 10,322,336 B2

HAPTIC BRAILLE OUTPUT FOR A GAME CONTROLLER

RELATED APPLICATIONS

This application is a continuation in part of and claims priority to U.S. patent application Ser. No. 15/445,786, filed Feb. 28, 2017, which is a non-provisional of and claims priority to U.S. provisional patent application Ser. No. 62/453,404, filed Feb. 1, 2017, all of which are incorporated herein in their entirety.

BACKGROUND AND DESCRIPTION OF RELATED ART

Electronic gaming is a popular form of entertainment in which a user manipulates an object or a character or otherwise provides input using a game controller. Usually, game controllers include various types of controls that may be configured to be manipulated by a user's fingers to provide various inputs as the game controller is held within the user's hands. A game controller may include push buttons, triggers, touch pads, joysticks, bumpers, directional pads, and the like. A user may engage the various types of controls to provide control signals that map to or actuate different operations within video games.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1A:
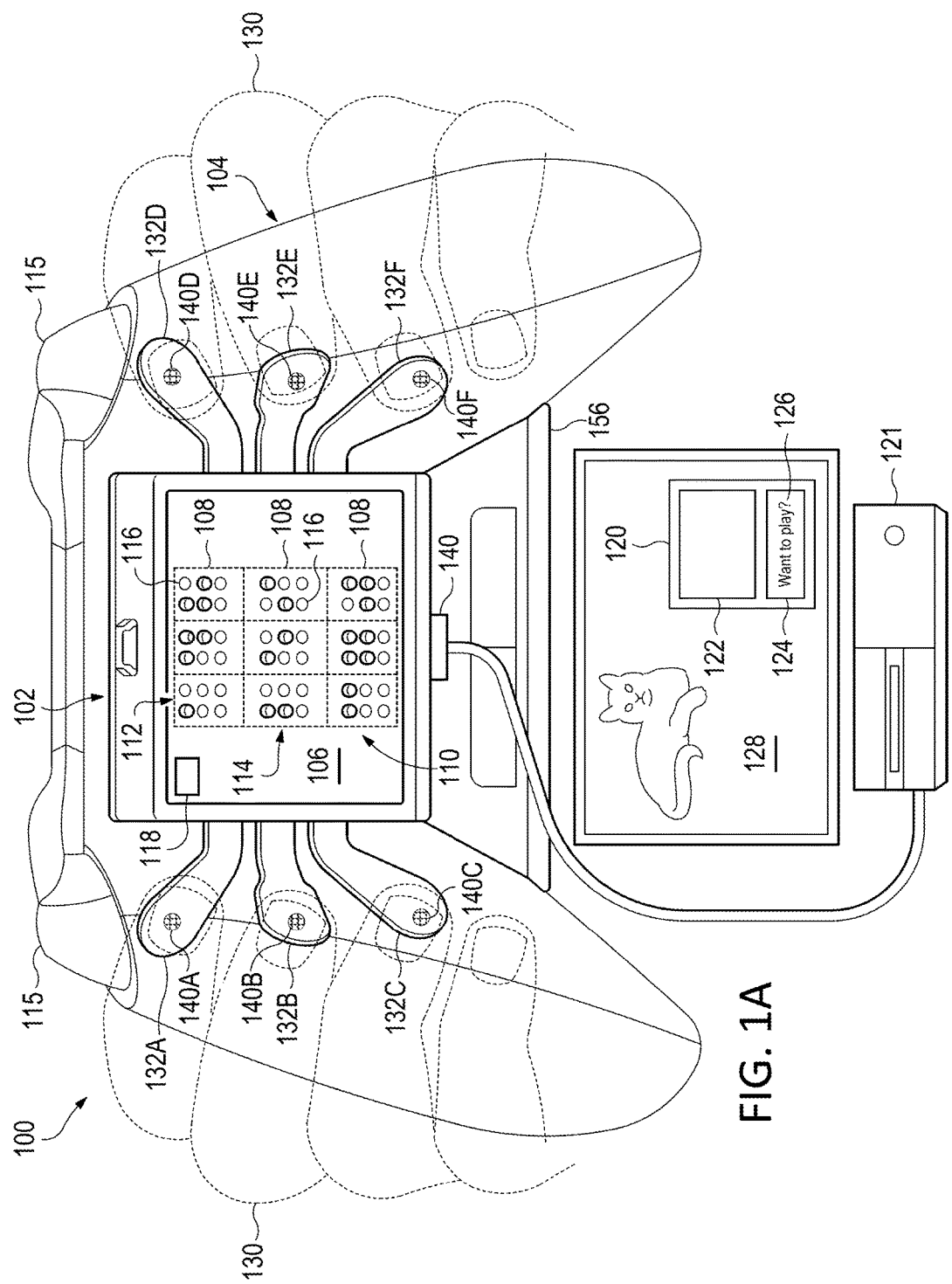
FIG. 1A illustrates, in accord with some embodiments, a bottom-view of an exemplary game-controller with an attached exemplary Braille accessory.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations do not have to be performed in the order of presentation. Operations described may be performed in a different order than the described embodiment. Various additional operations may be performed and/or described operations may be omitted in additional embodiments. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are considered synonymous.

Many game controllers, and the individual controls within them, may be challenging to operate for users that have a physical disability, particularly users that are visually-impaired or blind. Some early games, for example, were text heavy, requiring the user to imagine the virtual world in which the game takes place by reading text, which often made the game inaccessible and excluded visually-impaired or blind users. Some of the greatest game improvements have occurred in the use of complex graphics. Games employing these complex graphics are challenging to use for visually-impaired or blind users since the accompanied audible feedback may only describe the game's complex graphics in a limited manner through the use of screen readers. In addition, when a game is moving quickly, such as in a fighting game, the output from a screen reader may lag gameplay. Although the gaming industry has made some progress towards improving a game's general accessibility, a need remains for improved game controllers and accessories that address the very specialized manner in which visually-impaired or blind users interact with video games. The present disclosure relates to a game controller providing, among other things, Braille (or other) input, as well-as and haptic-enabled Braille (or other) output.

Figure 1B:
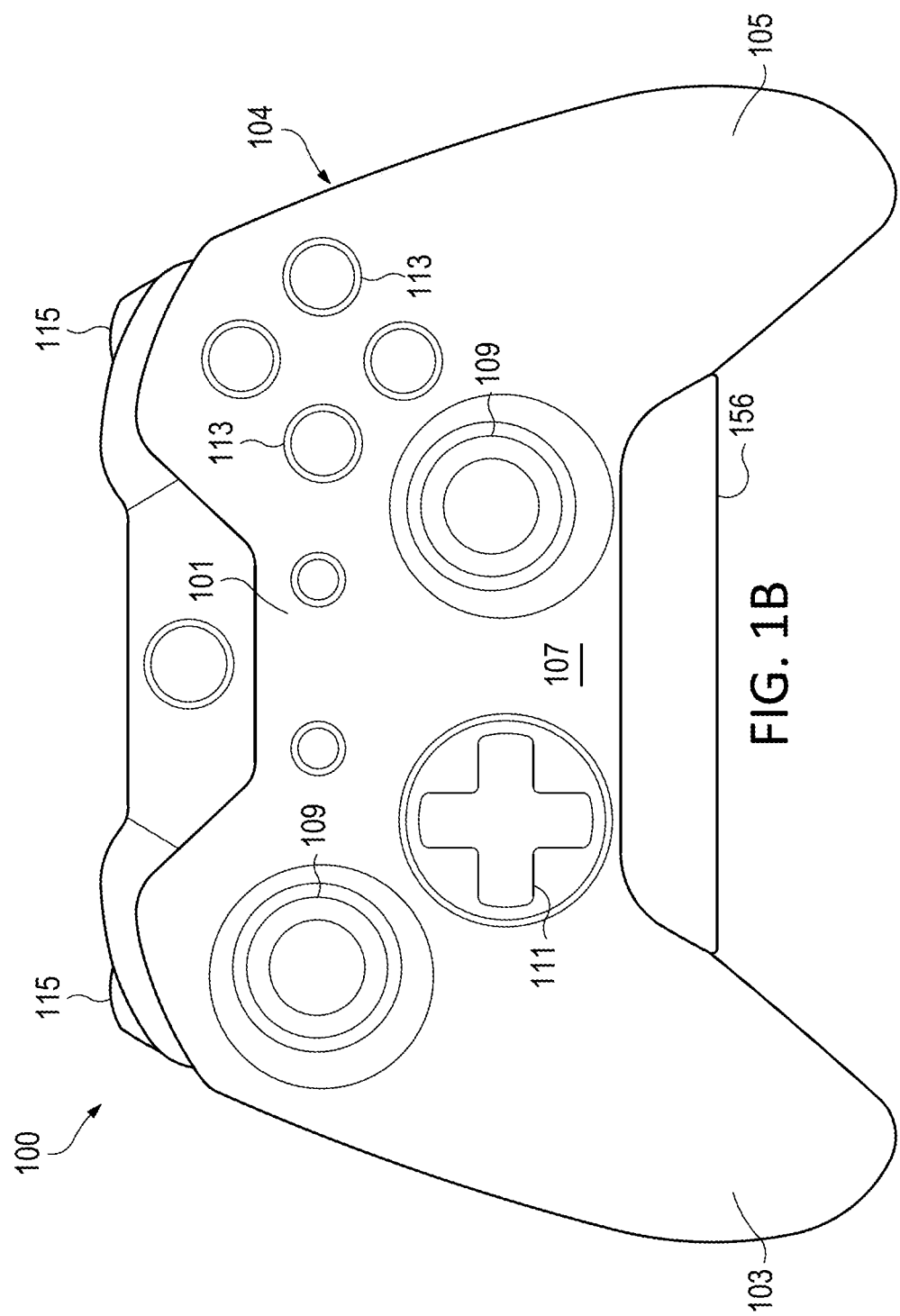
FIG. 1B illustrates, in accord with some embodiments, a top view of an exemplary game controller system.
Figure 1C:
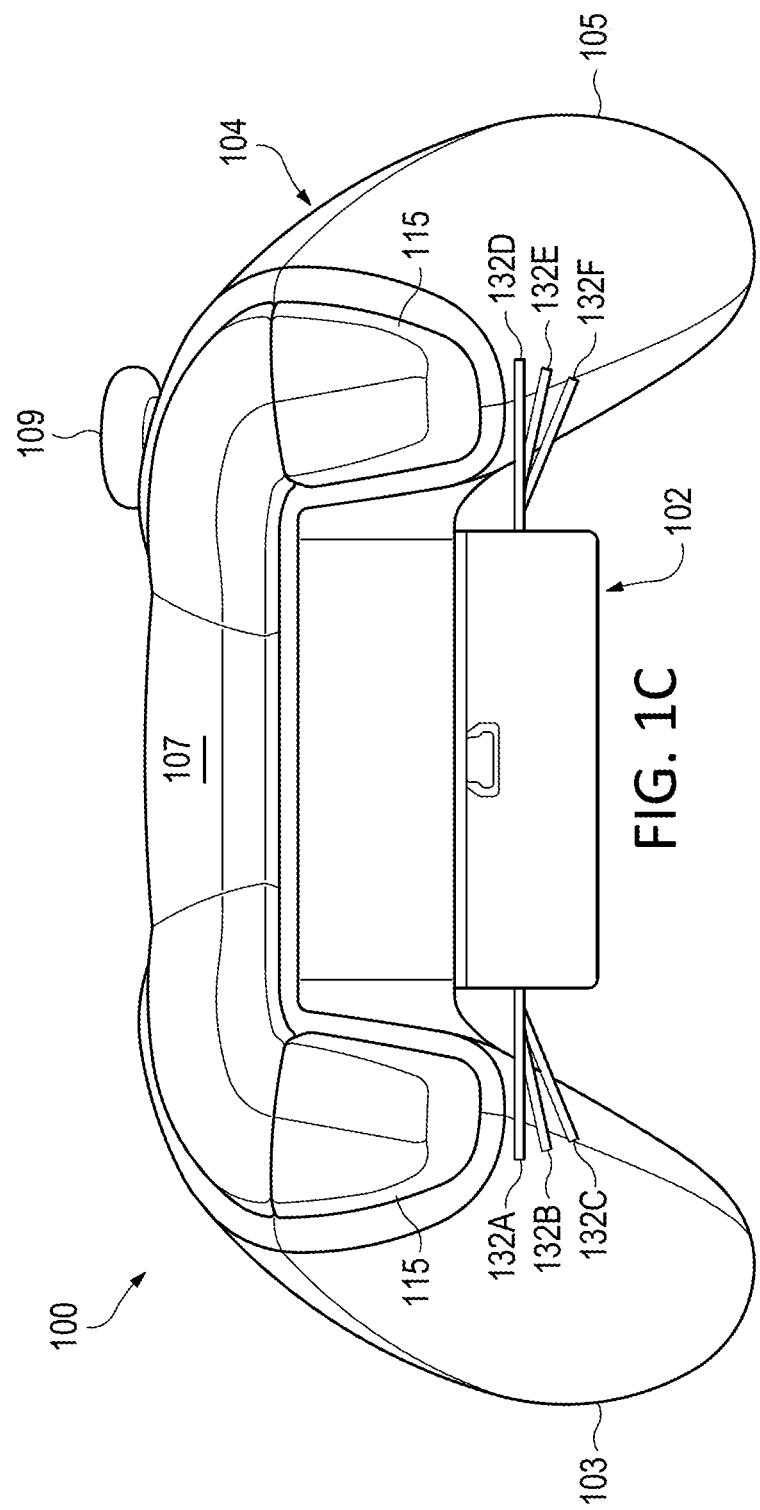
FIG. 1C illustrates, in accord with some embodiments, a side view of an exemplary game controller system.

FIGS. 1A-1C are views of an exemplary game controller system 100, in accordance with some embodiments. Referring to FIGS. 1A-1C, a game controller system may include a game controller 104 and a Braille accessory 102 that may be part of the controller, or in some embodiments, removably attached to game controller. The Braille accessory may provide a visually-impaired or blind user with Braille input and output gaming capability. As will be discussed in more detail below, the Braille accessory may be configured to provide output duplicative of other Braille output devices associated with the game controller, or it may be used to provide data separate from other accessibility related output such as other Braille output from other devices associated with the game controller system.

Game controller 104 may be sized and shaped to be held by hands 130 of a user as is well known to a person of ordinary skill in the art. In an embodiment, the game controller may be shaped or sized to fit an average hand size of a population of users. It will be appreciated that different target audiences may be determined and specific controller sizes and/or shapes employed in game controller design to accommodate a particular targeted audience. In the illustrated embodiment, the game controller may include controls on a top side for manipulation by a user's thumbs and controls on a bottom side for manipulation by a user's fingers, as the user grips game controller using with two hands. Users may have preferences on the shape, size, position and texture of such thumb-side and finger-side controls that differ from the standard controls that are integral to the game controller. Moreover, some users may prefer to manipulate controls on just the thumb-side of the game controller without having controls located on the finger-side of the game controller.

Game controller 104 may be configured to translate user input into control signals that are provided to a computing device 121. It will be appreciated that the computing device may be a personal computer, gaming console, laptop, tablet, mobile device, and the like. The control signals may be mapped to commands to control a video game or perform other operations to control the video game or the computing device. In an embodiment, the game controller may be configured to transmit control signals to a computing device using any wired or wireless transmission means known to a person of ordinary skill in the art. See FIG. 2 for an exemplary embodiment of a machine that may be used to implement the illustrated computing device, as well as for discussion of exemplary technology that may be used to transmit control signals with between the game controller, computing device, and other devices.

As illustrated in FIG. 1B, Game controller 104 may include a grip configured to be held using two hands 130. As such, the grip includes a left-hand portion 103 configured to be gripped by a left hand and a right-hand portion 105 configured to be gripped by a right hand. The right-hand portion may oppose the left-hand portion. Further, a central portion 107 may be positioned intermediate the left-hand portion and the right-hand portion and may house a plurality of controls, e.g., joysticks 109, directional pad 111, action buttons 113, triggers 115, and the like. In addition to conventional button/trigger types of input, alternative input options may be employed. For example, the game controller or computing device 121 may use other inputs (not illustrated) for receiving user input. For example, input may be based on audio information such as vocal commands, e.g., pitch commands from generated sounds (for example, humming, singing, playing a single-note instrument, playing a polyphonic note instrument, etc.); modulated sounds, with meaning determined by length (e.g., short vs. long sounds), or combinations of pitch and duration; finger snaps; surface taps (e.g., not on display and/or buttons but, for example, on a hard surface such as a table); tooth clicks; tongue clicks; whistles; hand claps; or lip smacks and puffs. In one embodiment, input may be based on optical information, for example, finger and limb motions as detected optically, optical recognition of American Sign Language (ASL) or other signed language, or light flashes, varying color, duration, duty cycle. In one embodiment, input may be based on electrical information, such as EEG and other neural-electrical signals, electrical sensing of muscle movements, or measured skin response such as galvanic skin response or the like.

Braille Display Output

In an embodiment, Braille accessory 102 may be incorporated as part of the game controller 104 to provide output to a user. In one embodiment, Braille accessory may be sized to be received by (i.e., attached to) a handheld-sized game controller such as the game controller 104. The Braille accessory may be removably attached to an underside of the game controller as shown in FIG. 1A using any attachment means known to a person of ordinary skill in the art, such as attachment mechanism 156, which is developed further below.

Braille accessory 102 may include a Braille display 106 to output a Braille representation of any game text 126 or any game audio occurring during the course of game play (and displayed on output section 122 of game display 128) to make the game text accessible to visually-impaired or blind users. In an embodiment, the game text may include text that is displayed in a game chat window or box 120 in which gaming participants can engage in live discussion with one another. The game chat window may be used to allow a user to see received messages, as well as sent messages. It will be appreciated the game chat window may have any of a variety of designs, and that it may be used for other messaging if desired. It will be further appreciated other accessibility content (e.g., sights, sounds, text, etc.) may be incorporated into gameplay and this may be represented on the Braille display.

For example, content such as Braille-related data included in the game may be presented to the Braille display 106 (and/or other Braille output not illustrated). In addition, descriptive content about visual elements, such as a voiceover to explain all/selected game activity (as may be included in certain motion pictures) may be provided and converted into a corresponding Braille output form. Still further, other textual elements and/or symbols within a game may be represented on the Braille output. The content presented to the Braille display (or other outputs) may be general game play information, or, in some embodiments, output such as that presented to the Braille components, such as the Braille display, is filtered to present data specific to the user of the game controller 104.

Game chat window 120 may include a larger output section 122 on top of a smaller input section 124. The larger output section may show messages the user may have already sent or messages that the user may have received from other players. Other output may be selectively be displayed in output section 122 but nonetheless may be presented on Braille output associated with the game controller 104. That is, it will be appreciated by one skilled in the art that different input/output may be present on the various inputs and outputs of the game controller. Input section 124 for example may display messages created by the user in real time that have not yet been sent. It will be appreciated input may be by way of input entered using the game controller, or by way of voice commands that are converted into input, or some combination of these and possibly other inputs. Online video games, especially massively multiplayer online (MMO) games, often include chat windows or boxes 120 for communication between players. Chat windows or boxes may be customizable in size, color, location, and the like and may be changed to receive only messages from certain players or include multiple tabs to provide different information in discrete layers of a single window display, such as display 128. In some circumstances, any kind of game audio may be translated to Braille for output to Braille display 106. As noted above, such audio, or other data such as visual information, voice-over, direct messaging, etc. may be filtered for relevance to a user of the game controller for presentation to the Braille display.

Braille accessory 102 may receive game text 126 or game audio using any wired or wireless transmission means known to a person of ordinary skill in the art. (See, e.g., FIG. 2.) In an embodiment, the Braille accessory may receive the game text using a wired cable 140 connected between the Braille accessory and a machine, such as computing device 121, executing the game, e.g., a personal computer or gaming console. In an embodiment, the Braille accessory may receive game text using any wireless means known to a person of ordinary skill in the art, e.g., a wireless circuit or receiver. In yet another embodiment, the Braille accessory may receive game text from game controller 104 through a wired or wireless connection between the Braille accessory and the game controller. The game controller may receive game text from the computing device executing the game through any wired or wireless means known to a person of ordinary skill in the art, e.g., cables, wireless receivers, and the like. The game controller, in turn, may transmit game text to the Braille accessory for translation from text to Braille, for output on Braille display 106. In an embodiment, translation of game text to Braille may occur at the Braille accessory (e.g., using control circuit 165). In other embodiments, translation of game text to Braille may occur at the game controller, with the results transmitted to the Braille accessory for output on the Braille display.

Figure 4:
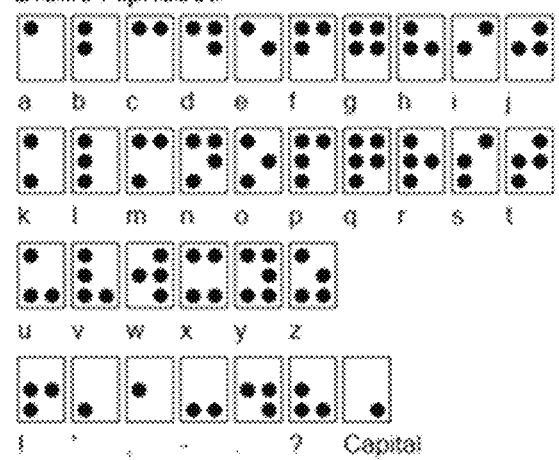
FIG. 4 illustrates an exemplary Braille alphabet.

Braille display 106 may include a plurality of Braille cells 108 arranged in an array 110 having a plurality of columns 112 and rows 114. Although FIG. 1A shows the array having three columns and three rows, a person of ordinary skill in the art will recognize Braille may be represented in different formats and that the array may contain any number of Braille cells arranged in any number of columns or rows and all such variations are intended to be within the scope of this disclosure. In the illustrated embodiment, each Braille cell includes six pins or dots 116 arranged in two columns and three rows that can be read tactually with the fingers of visually-impaired or blind users. Each Braille cell may represent a single letter, number, punctuation, or other character using Braille coding as is well known to a person of ordinary skill in the art. It will be appreciated other encoding schemes and cell sizes may be employed so that multiple outputs may be presented in a single cell. Such packed cell encoding may be advantageous in certain circumstances, such as in an output rich environment such as a gaming environment. FIG. 4 illustrates an exemplary Braille alphabet.

It will be appreciated that depending on the implementation and use-case desired for Braille output, one or more Braille cells 108 may be rotated by a desired number of degrees, e.g., ninety degrees such that six pins or dots 116 are arranged in three columns and two rows (i.e., three pins or dots arranged horizontally and two pins or dots arranged vertically). It will be appreciated other rotation amounts may be used depending on the desired use. In the ninety degree rotation example, a "line" of text may be formed not by horizontally-adjacent cells, but by vertically-adjacent cells to account for the user's finger position on Braille accessory 102 on the back of game controller 104. That is, rotating Braille cells by ninety degrees allows for user finger positions, as they wrap around from front to back of the game controller, to read more naturally a line of text on Braille display 106. Depending on the type of controller, and the configuration of the controller, different orientations of one or more Braille cells may be used.

To read Braille display 106, it will be appreciated a visually-impaired or blind user may run fingers, e.g., index, middle, ring, or pinky fingers, on hands 130 through the Braille cells 108 to tactually detect raised pins or dots 116 as is well known to a person of ordinary skill in the art. In an embodiment, a visually-impaired or blind user may read the Braille display vertically from top to bottom and left to right such that the first character is represented in the Braille cell located in the first column 112 first row 114, the second character is represented in the Braille cell located in the first column second row, the third character is represented in the Braille cell located in the first column third row, the fourth character is represented in the Braille cell located in the second column first row, the fifth character is represented in the Braille cell located in the second column second row, and so on.

Braille display 106 may further include scroll actuator 118 to scroll game text 126. Scroll actuator 118 may include any actuating means known to a person of ordinary skill in the art, including any electronic or mechanical actuating means, e.g., switch, push button, touch activated electronic switch, and so on. Because the Braille display has a predetermined number of Braille cells 108 that may represent a predetermined number of characters in the game text or game audio, it may be necessary for a visually-impaired or blind user to actuate or otherwise indicate to Braille accessory 102 that it is ready to receive a new batch of characters from the game text by actuating the scroll actuator after reading the current batch of characters displayed or output on the Braille display. A visually-impaired or blind user may program or set the Braille accessory to scroll a single column 112 or row 114 or multiple columns or rows of new characters per each actuation of the scroll actuator. Conversely, a visually-impaired or blind user may program or set the Braille accessory to scroll all new characters per each actuation of the scroll actuator. In an embodiment, the scroll actuator may scroll the translation of the game text or game audio one character at a time in a vertical direction, with an oldest character represented by a top left Braille cell being scrolled off the Braille display and a newest character to be represented by a bottom right Braille cell scrolled on to the Braille display.

In one embodiment, a component 140A-F is incorporated into paddles 132A-F to enable sensing when fingers are in contact with paddle surfaces and communicating that presence or pressure signal to an actuating circuit. In one embodiment a pressure-sensing or electrical or capacitance based finger-detecting device is incorporated into the paddles, and in this embodiment, the scroll actuator 118 may be implemented at least in part on detecting fingers are present at the paddles to facilitate determining a particular output has been received and output may continue on to a next output to be presented.

Haptic Braille Input/Output

Braille accessory 102 may include six Braille paddles 132A-F to allow a visually-impaired or blind user to input or chord Braille characters during the course of game play to send to other players, as well as to receive output presented to the user by way of the paddles. In the illustrated embodiment, the paddles are arranged as a two by six block cell (2 columns, 3 rows) which as shown in FIG. 4 may be used to encode a Braille character or symbol. As discussed above with respect to Braille display 106, a visually-impaired or blind user may run fingers through Braille cells 108 to tactually detect raised pins or dots 116 to get Braille output. In the illustrated embodiment, the paddles may be used to receive Braille output by some combination of haptic (or kinesthetic) feedback on the paddles and/or (if desired) movable, extruding, or otherwise detectable pins, dots, ridges, or other elements incorporated into paddle components 140A-F detectable on a paddle's surface. During use of a game controller 104 Braille characters may be presented to the Braille paddles.

As discussed above, output to the paddles may be regulated in a variety of ways including through use of scroll actuator 118 and/or through detecting of fingers present on the paddles. It will be appreciated while the foregoing speaks to using paddle components 140A-F to both detect the presence of fingers on the paddles, and to provide haptic Braille output across the paddles, this combined role is for expository convenience. It will be understood by one skilled in the art multiple elements may be incorporated into paddle design as desired. And, although paddles using haptic feedback are alone sufficient to convey Braille output across the paddles, this may be used in addition to pins, dots, ridges, etc. to further provide indicia to a user of which paddles are being used to present Braille output using the paddles.

It will be appreciated any of a variety of known electrical and/or mechanical stimulation of a paddle or components attached to a Braille paddle may be used to produce a detectable haptic output on one or more of the paddles 132A-F. A particular combination of haptic outputs to selected paddles may present a specific Braille character or symbol to fingers 130 holding game controller 104. In one embodiment, the Braille paddles may be used instead of Braille display 106. In an alternate embodiment, both Braille outputs may be used, and if desired, a first output may be presented to the Braille display and a second different output presented to the Braille paddles. In one embodiment, different types of output may be routed to the user over different Braille output depending on the information to be presented. For example, general game information might be provided using the Braille display.

It will be appreciated some content rich games may have a lot of information being presented to a user, and content may be filtering and/or routing may be desired. In one embodiment, general game information, or fast moving information such as general chat data, may be presented to Braille display 106, while information or activity specifically relating to the user, such as messages directed to the user, or certain game activity or sounds or other game play specifically affecting the user, this may be presented to the user using haptic feedback using the Braille paddles 140A-F. In this embodiment, a user is able, when desired, to focus on activity related to that user's game play. For example, a user may receive by way of the paddles warnings, indicia, or user-specific information (such as an impending attack) that that might otherwise be visually apparent to a sighted viewer. It will be appreciated any number of different haptic systems may be employed to provide output to the user so that Braille and other data may be tactically received by the user. In such fashion there can be a bifurcation of data presented to the user, with some data going to the Braille display 106 and other data (in the exemplary embodiment, user-specific information) going to the paddles.

In one embodiment, a touch sensitive surface structure 140A-F comprising a piezo structure may be in communication with a deformable surface, e.g., pins, bumps, etc. may be employed such that the piezo structure may generate a detectable output by fingers 130 holding game controller 104. In various embodiments, the Braille paddles may use bumps, pins, piezo structure, vibration, electric stimulation, or other haptic and/or otherwise feature a detectable output. It will be appreciated this exemplary piezo structure (or other haptic emitter) is capable of producing a signal to the deformable surface structure sufficient for a finger to feel a "click" or other haptic sensation. In one embodiment, a piezo actuating signal comprises a first slow charging portion and a second fast discharging portion, sufficient for the piezo structure to communicate the click and/or haptic sensation. Since the paddles may be arranged as a Braille cell, the surface structure 140A-F in the paddles 132A-F may present a collection of mechanical signals to various deformable surfaces sufficient for a person's fingers to feel a combination of haptic outputs across the paddles that represents an encoding of a Braille character output.

It will be appreciated by one skilled in the art there are many different ways to implement haptic feedback. Examples of haptic feedback are buzzing, vibration, jiggling, force feedback, and the like. There are well understood technologies incorporating weights, motors, circuits, actuators, etc. to generate the haptic feedback or other tactile output discernable to a user. In the illustrated embodiments, the piezo or other haptic feedback may be individually associated with each paddle of the game controller so that, as discussed above, Braille output may be received at the paddles to provide various output to the user.

For example, in the FIG. 1E embodiment (discussed in more detail below) a printed circuit assembly 160 may include haptic feedback emitters/generation devices. In one embodiment, haptic emitters may be incorporated into the illustrated items 164. It will be appreciated a combined actuator/haptic emitter is proposed for expository convenience, and in other embodiments (not illustrated), haptic feedback may be provided by separate emitting devices associated with the circuit assembly. As noted above, various techniques may be used to step through output of a sequence of Braille characters. In one embodiment, the circuit assembly includes circuitry to detect finger presence to assume a Braille character or other output was received and control output advancement to a next output. It will be appreciated any of the buttons, controls and actuators on a game controller may be employed to affect how output is received and/or presented across the Braille paddles 140A-F, e.g., buttons may be used to speed up or slow down the output, or to switch between different game data that may be output. In one embodiment, if the paddles 132A-F are presenting messages (Braille or otherwise) directed at the user, a user may elect to have the paddles present indicia of other game activity or other game related information, such as data affecting the user's game play.

Braille paddles 132A-F may be shaped or curved to follow a contour game controller 104 as the game controller is gripped by hands 130. The Braille paddles may be located on a finger-side of the game controller, with three Braille paddles 132A-C on a right side and three Braille paddles 132D-F on a left side of the game controller, when the game controller is gripped thumb-side up by hands of a visually-impaired or blind user. The Braille paddles may be manipulated by fingers other than the thumbs, e.g., index, middle, ring, or pinky fingers, of a user gripping the game controller with both hands. Control circuit 165 on Braille accessory 102 may translate a touch force applied to any of the Braille paddles into an individual Braille character. This allows, in combination with haptic feedback, for the Braille paddles to be used to both send, and receive, Braille encoded information while holding the game controller.

In an embodiment, Braille paddles 132A-F may be actuated by a touch force from fingers of hands 130 to generate signals that are mapped or translated from Braille to text 126 or game audio. In one embodiment, the text or game audio is then transmitted from the Braille accessory to computing device 121 or from the Braille accessory to game controller 104 to the computing device for display on input section 124 before being displayed on output section 122 of chat window 120 after being sent. Such a configuration would allow a visually-impaired or blind user to communicate with other players in real time. The chording of Braille on Braille paddles 132A-F is well known to a person of ordinary skill in the art and may follow any number of Braille coding schemes, such as the 6-dot scheme shown in FIG. 4. A person of ordinary skill in the art should recognize that other Braille coding schemes exist that come within the scope of the disclosure, e.g., 8-dot Braille coding schemes. Similarly, output to the Braille paddles may employ a similar known encoding scheme and allow real-time receipt of replies to the user without having to remove fingers from the paddles. This facilitates, for example, a user to use other fingers, e.g., thumbs and pointer finger, to manipulate game controller buttons to engage in the game while simultaneously engaging in two-way conversation using the Braille paddles.

As will be appreciated by one skilled in the art, not all possible combinations of dot patterns are used so a game may elect to encode other game information, status, alerts, etc. as unused characters or character sequences initiated with an unused character. Braille accessory 102 may transmit the Braille chords input by a visually-impaired or blind user using Braille paddles 132A-F to computing device 121 or game controller 104 using any wired or wireless transmission means known to a person of ordinary skill in the art, e.g., cable 140, wireless circuit or receiver (not shown), and the like. Each of the Braille paddles may be shaped for actuation by a user's fingers, other than the thumb, as the user grips the game controller using both hands and as the Braille accessory is received on an underside of the game controller.

In an embodiment, Braille paddles 132A-F may be removably affixed or attached to Braille accessory 102 or game controller 104 via any attachment mechanism known to a person of ordinary skill in the art, e.g., screws or other fasteners. Moreover, haptic feedback may be incorporated into the paddle such that removing a paddle allows it to be updated with a newer sensing or feedback technology. Or, haptic feedback may be incorporated, for example, into the connection point of the paddle to the game controller such that the paddle may be an inexpensive component easily replaceable if it wears out or breaks. In one embodiment the Braille paddles may be quickly and easily swapped out without the use of tools. Such a configuration may facilitate using differently sized or oriented Braille paddles for a designing a customizable game controller.

Referring to FIGS. 1B and 1C, game controller 104 may include a plurality of controls located on a top or thumb-side. These controls may be configured to be manually manipulated by right and/or left thumbs of a user gripping the game controller with two hands 130 during gameplay. In some embodiments, a user may manipulate one or more of the plurality of controls with an index finger. The plurality of controls may include joysticks 109, directional pad 111, action buttons 113, triggers 115, and so on as is well known to a person of ordinary skill in the art. The game controller may include any suitable number and type of controls.

Figure 1D:
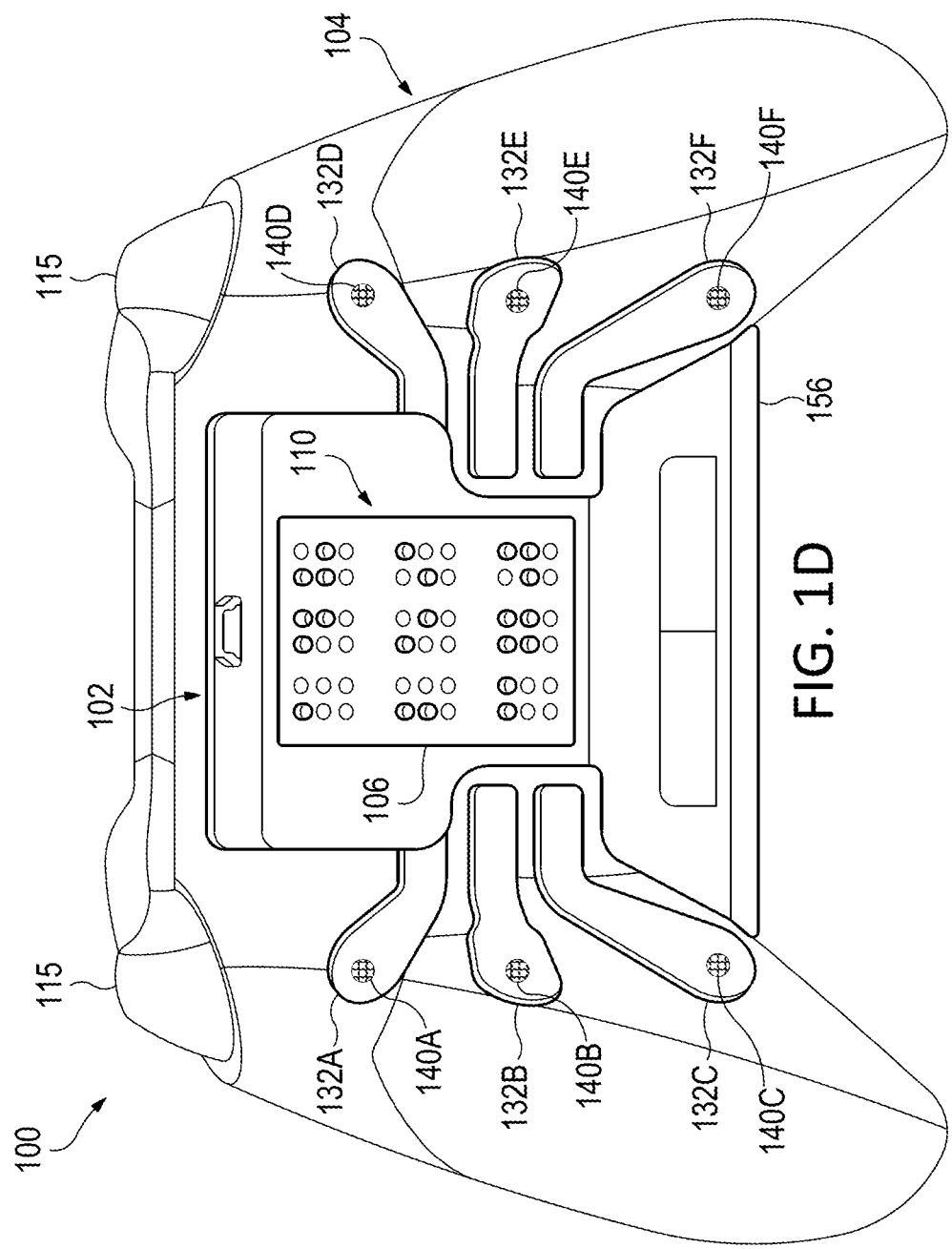
FIG. 1D illustrates, in accord with some embodiments, a bottom view of an exemplary game controller system with an exemplary Braille accessory.

FIG. 1D is a bottom view of an exemplary game controller system with an attached exemplary Braille accessory with haptic feedback adapted paddles, in accordance with some embodiments. Referring to FIGS. 1A-1D, Braille accessory 102 may include multiple, e.g., two removably attached Braille paddles 132A and 132D coupled to operate with four Braille paddles 132B, 132C, 132E, and 132F removably attached to game controller 104. In an embodiment in which the Braille accessory is removably attached to the game controller, the Braille accessory may receive control signals from all six Braille paddles 132A-F that the Braille accessory then translates from Braille to another data format, e.g., text. The Braille accessory then transmits translated data to computing device 121 for display as text 126 on input section 124. In an embodiment in which four Braille paddles 132B, 132C, 132E, and 132F are removably attached to the game controller, the Braille accessory may receive controls signals for Braille paddles 132B, 132C, 132E, and 132F from the game controller that the Braille accessory then synchronizes or otherwise couples to controls signals from Braille paddles 132A and 132D, before translating the Braille chording representative of all six Braille paddles 132A-F into another data format, e.g., to text 126.

In one embodiment, game controller 104 may receive control signals from all six Braille paddles 132A-F, including Braille paddles 132A and 132D attached to Braille accessory 102, that game controller 104 then translates from Braille to text and transmits to computing device 121 for display as text 126 on input section 124. The game controller may also receive control signals from the computing device 121 signals corresponding to text and/or other information generated by a program running on the computing device that is then presented to a user, such as through haptic output presented across all six Braille paddles, including Braille paddles 132A and 132D.

Figure 1E:
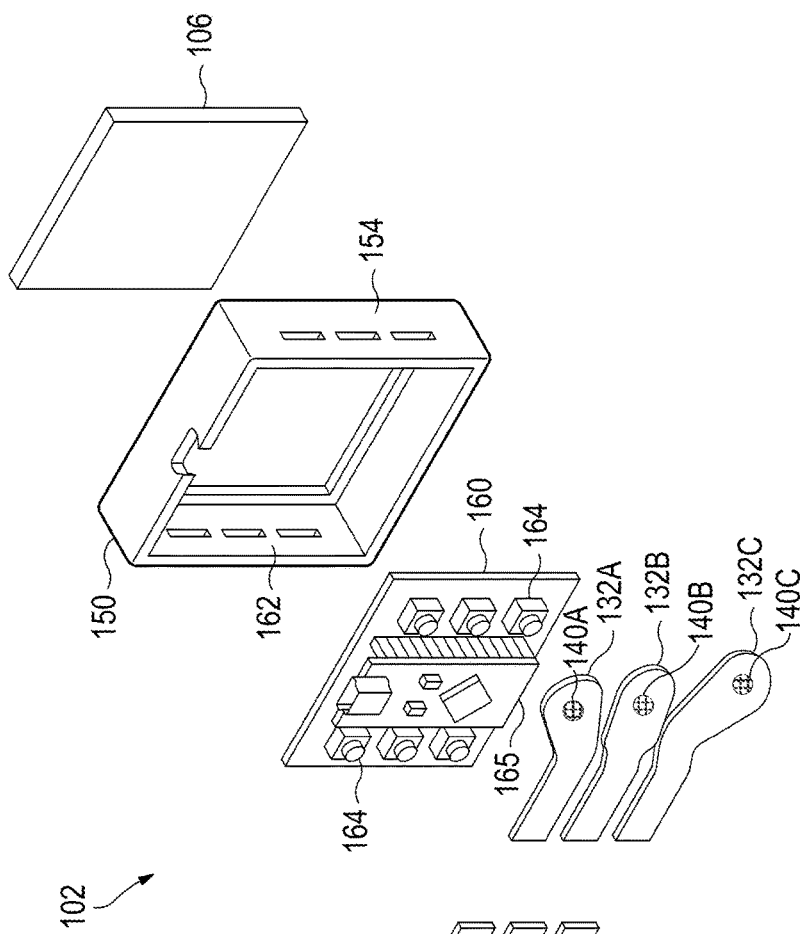
FIG. 1E illustrates, in accord with some embodiments, an exploded view of an exemplary Braille accessory.
Figure 1E:
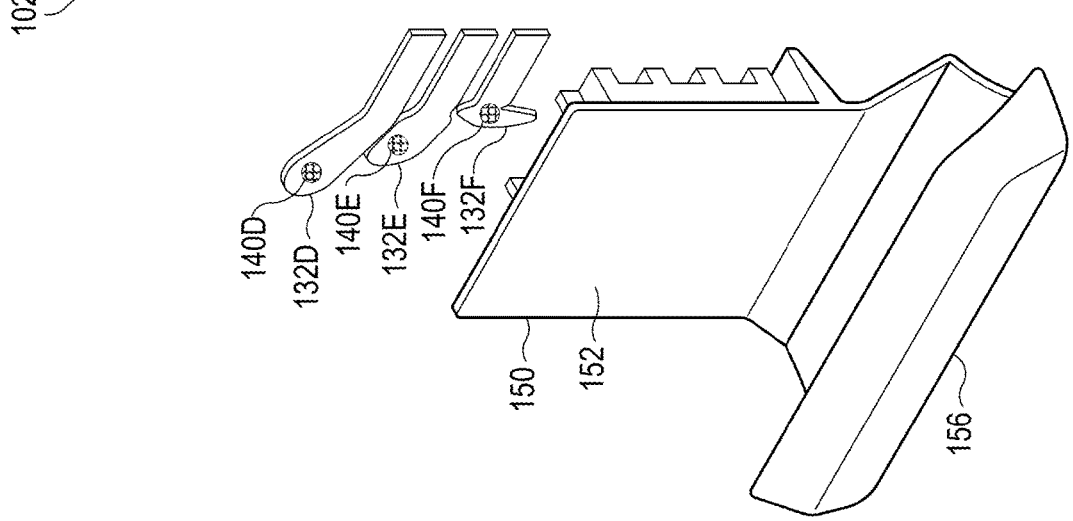

FIG. 1E is an exploded view of an exemplary Braille accessory, in accordance with some embodiments. Referring to FIGS. 1A-1E, Braille accessory 102 may include a housing 150 to enclose electronic circuits and mechanisms that control operation of Braille display 106 and/or Braille paddles 132A-F. The housing may include a first housing portion 152 and a second housing portion 154 that removably attaches to the first housing portion using any removable fastening mechanism known to a person of ordinary skill in the art, e.g., screws, built in snaps, and the like. The first housing portion may attach to the second housing portion using snap features designed into the first housing portion and/or the second housing portion, when the first housing portion and second housing portion are made of molded plastic. The housing may be made of any material known to a person of ordinary skill in the art, e.g., plastic, metal, and the like. The first housing portion may include an attachment mechanism 156 to removably attach the Braille accessory to game controller 104. In an embodiment, the attachment mechanism may be a substantially u-shaped clamp that extends from an end of the first housing portion and removably attaches to central portion 107 of the game controller. In an embodiment, the attachment mechanism may removably attach to the game controller using any removable attachment means known to a person of ordinary skill in the art, e.g., fasteners, snap features built into the housing, and/or the game controller.

A printed circuit assembly 160 may be located in an interior cavity 162 of housing 150. The printed circuit assembly may include a plurality of electronic circuits 165 to control operation of Braille display 106 and/or Braille paddles 132A-F. In an embodiment, the printed circuit assembly may include a plurality of components 164 that may include actuation sensors and/or haptic emitters that correspond to the Braille paddles. Each of the Braille paddles may be configured to activate a corresponding actuation sensor in response to a force touch to generate a control signal responsive to being depressed (e.g., via finger manipulation). In an embodiment, control circuit 165 may detect actuation of the sensors to translate the touch force applied to the at least one of paddles 132A-F into individual Braille characters. In an embodiment, haptic emitters, e.g., within components 164, or incorporated into paddle components 140A-F, may be employed to emit a force applied to the at least one paddles 132A-F to output individual Braille characters. As discussed above, a variety of technologies may be employed to generate a vibration, buzz, etc. that may be used along with or instead of an extrusion, bump, ridge, etc. to indicate a particular paddle is being used for Braille output. It will be appreciated haptic output may be used simultaneously with a user activating the paddles to perform Braille character input, including to enter a command or commands to control operation of the game controller, or associated machine to which the game controller is communicating, or to affect the information presented as haptic output.

In some embodiments, printed circuit board 160 may include other sensors that correspond to the plurality of input controls, e.g., joysticks 109, directional pad 111, action buttons 113, or triggers 115. The plurality of actuation sensors 164 may be any type of sensor or switch known to a person of ordinary skill in the art capable of detecting actuation or manipulation of Braille paddles 132A-F, e.g., dome switches, tactile switches, buttons, levers, dials, rockers, Hall Effect sensors, and other electronic sensing components. Printed circuit assembly 160 may include any number or type of actuation sensors 164. The printed circuit assembly may include a processing device and a memory device as part of electronic circuits 165 to control operation of Braille display 106 and/or the input/output with Braille paddles 132A-F. The printed circuit assembly may also incorporate the motors, weights, power supplies and the like required for providing or implementing the different types of haptic feedback to the Braille paddles as discussed above.

Figure 2:
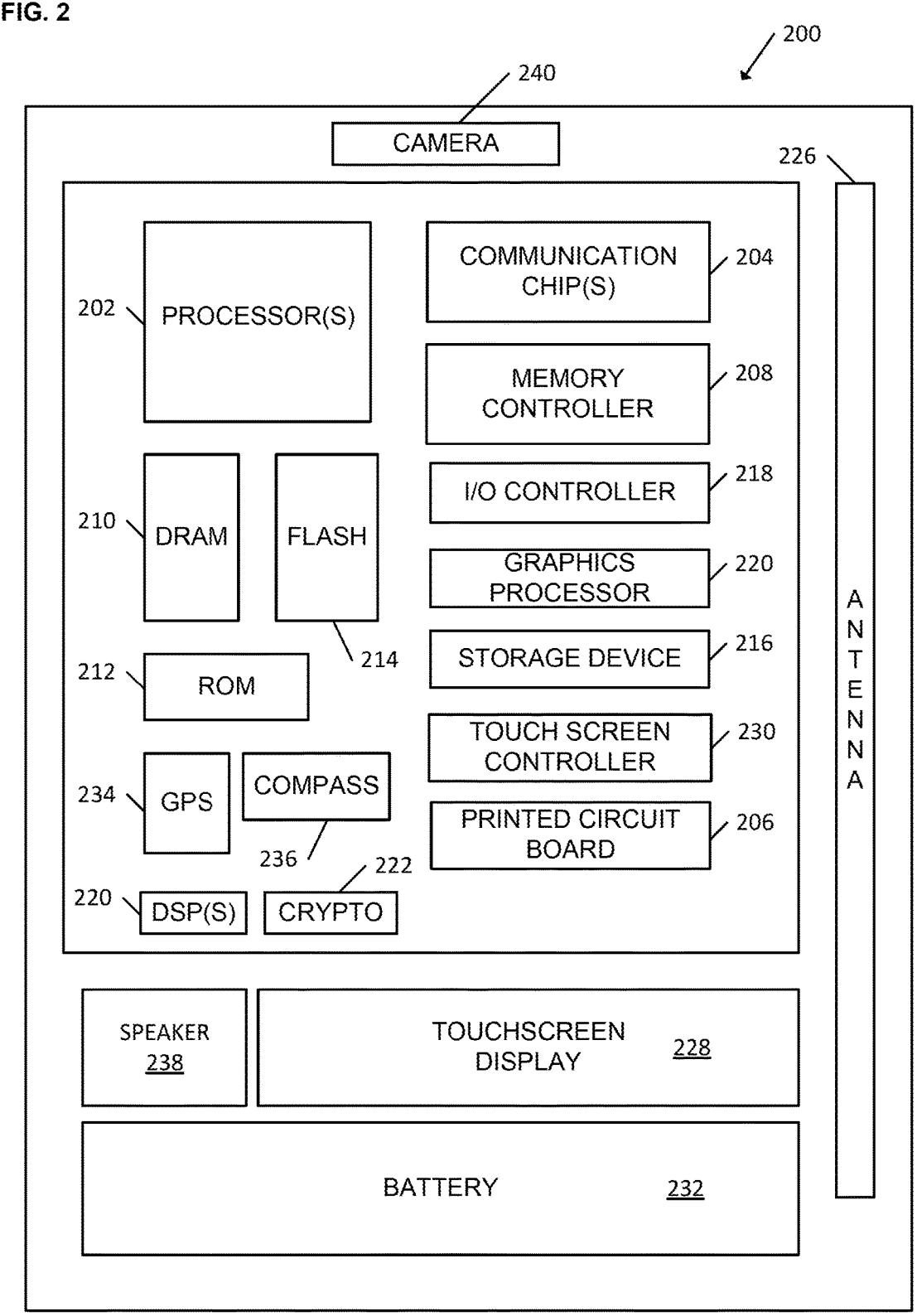
FIG. 2 illustrates according to one embodiment an exemplary computer device 200 that may employ the apparatuses and/or methods described herein.

FIG. 2 illustrates according to one embodiment an exemplary computer device 200 that may employ the apparatuses and/or methods described herein (e.g., FIG. 1A computing device 121), in accordance with various embodiments. As shown, computer device 200 may include a number of components, such as one or more processor(s) 202 (one shown) and at least one communication chip(s) 204. In various embodiments, the one or more processor(s) 202 each may include one or more processor cores. In various embodiments, the at least one communication chip 204 may be physically and electrically coupled to the one or more processor(s) 202. In further implementations, the communication chip(s) 204 may be part of the one or more processor(s) 202. In various embodiments, computer device 200 may include printed circuit board (PCB) 206. For these embodiments, the one or more processor(s) 202 and communication chip(s) 204 may be disposed thereon. In alternate embodiments, the various components may be coupled without the employment of PCB 206.

Depending on its applications, computer device 200 may include other components that may or may not be physically and electrically coupled to the PCB 206. These other components include, but are not limited to, memory controller 208, volatile memory (e.g., dynamic random access memory (DRAM) 210), non-volatile memory such as read only memory (ROM) 212, flash memory 214, storage device 216 (e.g., a hard-disk drive (HDD)), an I/O controller 218, a digital signal processor 220, a crypto processor 222, a graphics processor 224 (e.g., a graphics processing unit (GPU) or other circuitry for performing graphics), one or more antenna 226, a display which may be or work in conjunction with a touch screen display 228, a touch screen controller 230, a battery 232, an audio codec (not shown), a video codec (not shown), a positioning system such as a global positioning system (GPS) device 234 (it will be appreciated other location technology may be used), a compass 236, an accelerometer (not shown), a gyroscope (not shown), a speaker 238, a camera 240, and other mass storage devices (such as hard disk drive, a solid state drive, compact disk (CD), digital versatile disk (DVD)) (not shown), and so forth.

As used herein, the term "circuitry" or "circuit" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, processor, microprocessor, programmable gate array (PGA), field programmable gate array (FPGA), digital signal processor (DSP) and/or other suitable components that provide the described functionality. Note while this disclosure may refer to a processor in the singular, this is for expository convenience only, and one skilled in the art will appreciate multiple processors, processors with multiple cores, virtual processors, etc., may be employed to perform the disclosed embodiments.

In some embodiments, the one or more processor(s) 202, flash memory 214, and/or storage device 216 may include associated firmware (not shown) storing programming instructions configured to enable computer device 200, in response to execution of the programming instructions by one or more processor(s) 202, to practice all or selected aspects of the methods described herein. In various embodiments, these aspects may additionally be or alternatively be implemented using hardware separate from the one or more processor(s) 202, flash memory 214, or storage device 216. In one embodiment, memory, such as flash memory 214 or other memory in the computer device, is or may include a memory device that is a block or byte addressable memory device, such as those based on NAND, NOR, Phase Change Memory (PCM), nanowire memory, and other technologies including future generation nonvolatile devices, or a combination of any of the above, or other memory. The memory device may refer to the die itself and/or to a packaged memory product.

In various embodiments, one or more components of the computer device 200 may implement an embodiment of FIG. 1A game controller system 100, e.g., computing device 121, game controller 104, etc. In some embodiments, I/O controller 218 may interface with one or more external devices to receive a data, e.g., game controller 104. Additionally, or alternatively, the external devices may be used to receive a data signal transmitted between components of the computer device 200. The communication chip(s) 204 may enable wired and/or wireless communications for the transfer of data to and from the computer device 200. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip(s) may implement any of a number of wireless standards or protocols, including Digital Enhanced Cordless Telecommunications (DECT), Bluetooth, derivatives thereof, as well as any other wireless protocols including cellular and other technologies designated as 3G, 4G, 5G, and beyond. The computer device may include a plurality of communication chips 204. For instance, a first communication chip(s) may be dedicated to shorter range wireless communications such as Wi-Fi and Bluetooth, or other standard or proprietary shorter range communication technology, such as to communicate with a game controller 104, and a second communication chip 204 may be dedicated to longer range wireless communications, such as for computing device 121 to communicate with the Internet.

The communication chip(s) may implement any number of standards, protocols, and/or technologies datacenters typically use, such as networking technology providing high-speed low latency communication. Computer device 200 may support any of the protocols, infrastructures, and technology identified here, and since new high-speed technology is always being implemented, it will be appreciated by one skilled in the art that the computer device is expected to support equivalents currently known or technology implemented in future.

In various implementations, the computer device 200 may be a gaming console, a gaming console accessory, a handheld game controller or other game controller or accessory, a laptop, a netbook, a notebook, a smartphone, a computer tablet, a personal digital assistant (PDA), an ultra-mobile PC, a mobile phone, a desktop computer, a server, a printer, a scanner, a monitor, a set-top box, a digital camera, an appliance, a portable music player, or a digital video recorder, a transportation device (e.g., any motorized or manual device such as a bicycle, motorcycle, automobile, taxi, train, plane, drone, rocket, etc.), and an entertainment control unit (including within a transportation device). It will be appreciated computer device 200 is intended to be any electronic device that processes data.

Figure 3:
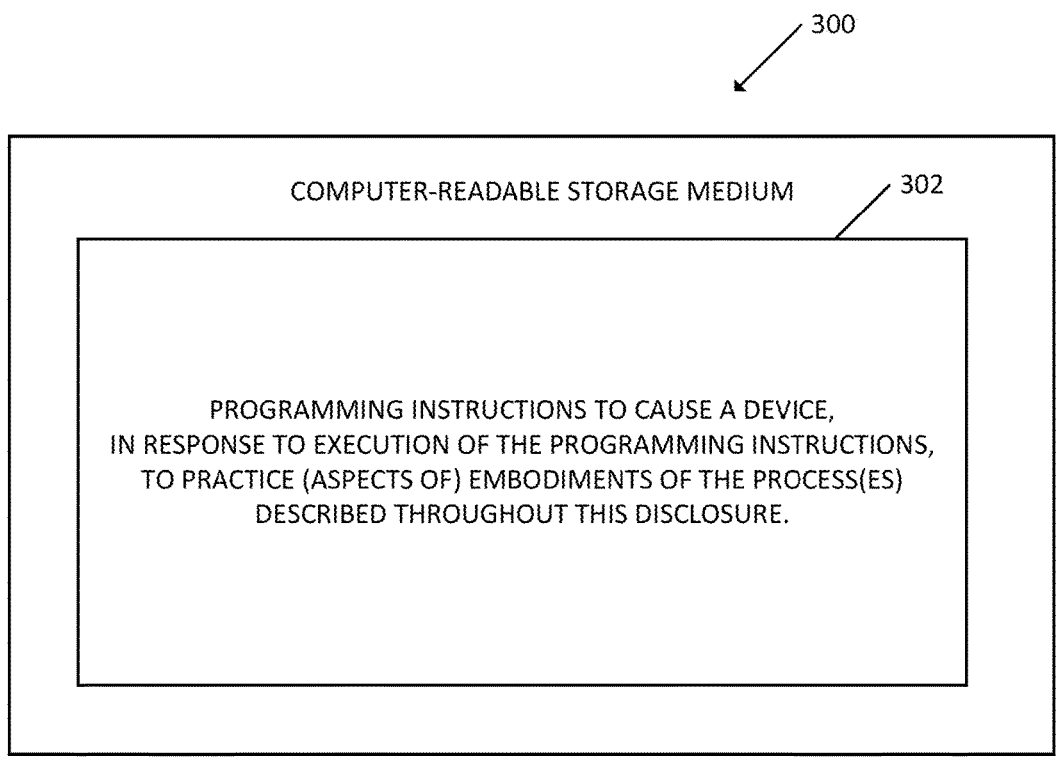
FIG. 3 illustrates according to one embodiment an exemplary computer-readable storage medium 300.

FIG. 3 illustrates according to one embodiment an exemplary computer-readable storage medium 300. The storage medium may be transitory, non-transitory or a combination of transitory and non-transitory media, and the medium may be suitable for use to store instructions that cause an apparatus, machine or other device, in response to execution of the instructions by the apparatus, to practice selected aspects of the present disclosure. As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. As shown, non-transitory computer-readable storage medium 302 may include a number of programming instructions 304. Programming instructions 304 may be configured to enable a device, e.g., computer device 200, in response to execution of the programming instructions, to implement (aspects of) the sidecar technology disclosed herein. In alternate embodiments, programming instructions 304 may be disposed on multiple computer-readable non-transitory storage media 302 instead. In still other embodiments, programming instructions 304 may be disposed on computer-readable transitory storage media 302, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Cooperative program execution may be for a fee based on a commercial transaction, such as a negotiated rate (offer/accept) arrangement, established and/or customary rates, and may include micropayments between device(s) cooperatively executing the program or storing and/or managing associated data.

The present disclosure may be described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A game controller with haptic Braille chording capability, comprising:
   a plurality of paddles arranged as a Braille cell on a housing;
   a control circuit to translate a touch force applied to selected ones of the paddles into a Braille character input; and
   a first haptic feedback emitter coupled with at least one paddle of the plurality of paddles to generate a force, detectable by contact with the at least one paddle, corresponding to a portion of a Braille character output.

2. The game controller of claim 1, further comprising:
   an adjustable tactile component disposed within selected ones of the plurality of paddles;
   wherein an adjustable tactile component for a first paddle may extrude a tactilely detectable portion contemporaneous to when the first haptic emitter generates the force for the first paddle.

3. The game controller of claim 1, further comprising:
   the first haptic feedback emitter coupled with multiple ones of the plurality of paddles to generate forces corresponding to a haptic representation of the Braille character output.

4. The game controller of claim 1, further comprising
   haptic feedback emitters coupled with each of the plurality of paddles, which when force is emitted by selected ones of the haptic feedback emitters, a pattern of haptic feedback across all of the plurality of paddles corresponds to the Braille character output.

5. The game controller of claim 1, wherein the force created by the first haptic feedback emitter is based at least in part on operation of a selected one or more of: a motor, a vibration element, an ultrasonic emitter, a piezo component.

6. The game controller of claim 1, in which the game controller is held by a hand having at least a finger in contact with the at least one paddle, further comprising:
   a contact sensor positioned in the at least one paddle to measure a degree of contact with the finger.

7. The game controller of claim 6, wherein the force is adjusted based at least in part on the degree of contact with the finger.

8. The game controller of claim 1, in which the game controller is held by a hand having fingers in contact with at least some of the plurality of paddles, further comprising:
   contact sensors positioned in each of the plurality of paddles to at least identify contact between fingers and the at least some of the plurality of paddles.

9. The game controller of claim 8, wherein a haptic pattern corresponding to the Braille character output, if emitted across selected ones of the plurality of paddles, can be considered received if the contact sensors identify contact with fingers on the selected ones of the plurality of paddles when the haptic pattern was emitted.

10. The game controller of claim 1, further comprising:
    a plurality of actuation switches each with a haptic emitter, and each coupled to a corresponding one of the plurality of paddles.

11. The game controller of claim 10, wherein:
    each of the plurality of paddles are shaped for manual manipulation by a finger as hands grip the handheld game controller;
    the control circuit detects actuation of the actuation switches to translate the touch force applied to the at least some of the plurality of paddles into individual Braille character input; and
    the haptic emitters of the plurality of activation switches translate the emitted forces applied to the at least some of the plurality of paddles into individual Braille character output.

12. An apparatus with haptic Braille chording capability, comprising:
    a plurality of paddles arranged as a Braille cell on a housing;
    a control circuit to translate a touch force applied to selected ones of the paddles into a Braille character input; and
    haptic feedback emitters coupled with each of the plurality of paddles, which when force is emitted by selected ones of the haptic feedback emitters, a pattern of haptic feedback across the plurality of paddles corresponds to a Braille character output.

13. The apparatus of claim 12, in which at least a portion of the apparatus is held by a hand having fingers in contact with at least some of the plurality of paddles, further comprising:
    contact sensors coupled with each of the plurality of paddles to at least identify contact between the fingers and the plurality of paddles;
    wherein a receipt of the Braille character output can be determined if contact sensors for the paddles corresponding to the Braille character output identify contact with fingers.

14. The apparatus of claim 13, wherein a delivery rate of Braille output characters is based at least in part on determining the receipt.

15. A method for using a game controller with haptic Braille chording capability based at least in part on a plurality of paddles disposed within the game controller, comprising:
    receiving force indicators for selected ones of the paddles;
    identifying a Braille character input based at least in part on which paddles had force applied to them;
    determining a Braille character output for presenting to the game controller;
    identifying a pattern of paddles corresponding to the Braille character output; and
    activating a haptic feature for each paddle in the pattern of paddles.

16. The method of claim 15, further comprising:
activating an adjustable tactile component of each paddle in the pattern of paddles contemporaneous with activating the haptic feature for each paddle in the pattern of paddles.

17. The method of claim 15, in which the game controller is held by a hand having at least a finger in contact with at least one paddle of the plurality of paddles, further comprising:
a contact sensor positioned in the at least one paddle to measure contact with the finger; and
determining receipt by use of at least a portion of the Braille character output corresponding to the at least one paddle based at least in part on a measured contact with the at least one paddle.

18. One or more non-transitory computer-readable media having instructions for using a game controller with haptic Braille chording capability based at least in part on a plurality of paddles disposed within the game controller, when executed, the instructions provide for:
receiving force indicators for selected ones of the paddles;
identifying a Braille character input based at least in part on which paddles had force applied to them;
determining a Braille character output for presenting to the game controller;
identifying a pattern of paddles corresponding to the Braille character output; and
activating a haptic feature for each paddle in the pattern of paddles.

19. The one or more non-transitory computer-readable media of claim 18, the media having further instructions to provide for:
activating an adjustable tactile component of each paddle in the pattern of paddles contemporaneous with activating the haptic feature for each paddle in the pattern of paddles.

20. The one or more non-transitory computer-readable media of claim 18, in which the game controller is held by a hand having at least a finger in contact with at least one paddle of the plurality of paddles, the media having further instructions to provide for:
a contact sensor positioned in the at least one paddle to measure contact with the finger; and
determining receipt by use of at least a portion of the Braille character output corresponding to the at least one paddle based at least in part on a measured contact with the at least one paddle.

* * * * *